United States Patent [19]

Birdsall et al.

[11] 4,198,131

[45] Apr. 15, 1980

[54] SILICONE RESIN OPTICAL DEVICES

[75] Inventors: Arthur A. Birdsall; John K. Fitzgerald; David P. Jones; Keith E. Polmanteer, all of Midland, Mich.

[73] Assignee: Dow Corning Corporation, Midland, Mich.

[21] Appl. No.: 905,626

[22] Filed: May 15, 1978

Related U.S. Application Data

[63] Continuation-in-part of Ser. No. 889,165, Mar. 23, 1978, abandoned.

[51] Int. Cl.² .................... C08G 77/00; G02C 7/04
[52] U.S. Cl. ................... 351/160 R; 351/160 H; 528/15; 528/31; 528/32; 528/43
[58] Field of Search ............ 351/160 R, 160 H; 528/15, 31, 32, 43

[56] References Cited

U.S. PATENT DOCUMENTS

| | | | |
|---|---|---|---|
| 3,228,741 | 1/1966 | Becker | 351/160 |
| 3,373,053 | 3/1968 | Clark | 117/126 |
| 3,474,039 | 10/1969 | Newing | 252/300 |
| 3,518,324 | 6/1970 | Polmanteer | 260/825 |
| 3,663,650 | 5/1972 | Juliano | 260/827 |
| 3,808,178 | 4/1974 | Gaylord | 260/86.1 E |
| 3,959,102 | 5/1976 | Wajs | 204/159.13 |

FOREIGN PATENT DOCUMENTS 52-84258 7/1977 Japan.
596668 1/1948 United Kingdom.

*Primary Examiner*—John K. Corbin
*Assistant Examiner*—Scott J. Sugarman
*Attorney, Agent, or Firm*—Robert F. Fleming, Jr.

[57] ABSTRACT

Optical devices such as corneal, scleral and interocular lenses are made from phenyl-containing siloxane resins. They combine a high degree of oxygen transmission with ease of fabrication inherent to hard materials, thereby providing increased wearer comfort and ease of fabrication. A typical resin is a copolymer of phenyl, vinyl and methyl siloxanes having at least about 0.2 phenyl groups per silicon.

12 Claims, No Drawings

SILICONE RESIN OPTICAL DEVICES

BACKGROUND OF INVENTION

This application is a continuation-in-part of our copending application Ser. No. 889,165, filed Mar. 23, 1978 now abandoned.

The standard material for making hard contact lenses is polymethylmethacrylate. This material is quite easy to fabricate by standard lathing and polishing techniques, but it suffers from the serious disadvantage of being almost impermeable to oxygen. Since the cornea of the eye is avascular, it is dependent upon atmospheric oxygen for its nurishment. Any material which decreases or seriously interferes with the flow of oxygen to the cornea will in time cause serious problems in the cornea. For that reason, polymethylmethacrylate lenses can be worn for limited periods of time which varies from individual to individual.

Because of this problem, various attempts have been made to increase the oxygen permeability of hard contact lenses such as, for example, by employing cellulose acetate butyrate polymers as a lens material. Although this gives some marginal increase in oxygen permeability they still fall far short of what is desired for prolonged wear in the eye.

Other attempts have been made to increase the oxygen permeability of methacrylate lenses by copolymerizing various methacrylate polymers with methylpolysiloxanes. A typical example of this effort is shown in U.S. Pat. No. 3,808,178 which involves the copolymerization of acrylate monomers with organosiloxanes containing the acrylate group attached to the silicon atom. This approach to the problem involves the preparation of complicated polymers with the attendant expense.

The best oxygen permeability of any known material for use in contact lenses is that obtained with silicone rubber. However, since silicone rubber is a soft flexible material, there is an inherent problem in fabricating lenses from it. This is particularly true with respect to grinding or shaping the edges of the lens.

Consequently, it is highly desirable to have a lens which approaches the oxygen permeability of silicone rubber but which also is hard enough to be fabricated by conventional techniques employed with polymethylmethacrylate lenses. Applicants have obtained this and other objectives by employing the particular phenyl-containing siloxane resins described hereinafter.

The lenses of this invention possess a combination of properties which are unique, as far as applicants are aware, over presently available hard or soft contact lenses. First they are made from commercially available materials and are thus inexpensive as compared to the more esoteric copolymers of organic and organosilicon compounds. Second they have a refractive index of 1.5 and can thus be fabricated into very thin lenses and still be ground to provide visual correction and patient comfort. Third the lenses are strong and tough enough to be cut into lenses as thin as 0.05 mm center thickness. For any given material the thinner the lens the more $O_2$ will pass through. Fourth the lens materials have excellent $O_2$ permeability. Fifth they are economical to fabricate because of their hardness. Sixth the lenses are biocompatible with the eye. Seventh the lenses can be rendered hydrophilic by standard techniques and eighth they have very long lens life because of the thermal, oxidative and chemical stability of phenyl-containing silicone resins.

STATEMENT OF INVENTION

This invention relates to optical devices consisting of lenses to be worn against or inside the eye having an open eye Equivalent Oxygen Performance (EOP) of at least 3 percent at 0.1 mm thickness and a light transmission of at least 85 percent, consisting essentially of a cured phenylpolysiloxane resin having a durometer of at least 60 on the D scale at the temperature of fabrication, said resin having been prepared by curing a polysiloxane composition having a phenyl to silicon ratio of at least about 0.2 and sufficient vinylsiloxane or silacyclopentenyl siloxane to give the desired durometer to the cured resin, essentially all the substituents on the silicon atoms in said siloxane composition in addition to phenyl, being selected from the group consisting of vinyl and butenylene* and optionally alkyl or haloalkyl radicals of 1 to 3 carbon atoms and hydrogen.

\* The butenylene group is —CH=CHCH$_2$CH$_2$— or —CH$_2$CH=CHCH$_2$— and appears in the form of silacyclopentenyl siloxane units, i.e.

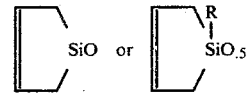

DETAILED DESCRIPTION OF THE INVENTION

The optical devices included in this invention are scleral, corneal and interocular lenses.

The term "consisting essentially of" means the device is composed primarily of the defined siloxane resins but may contain minor ingredients, such as stabilizers, pigments, biocides or other ingredients which do not change the essential character of the device.

The resins employed to make the lenses of this invention are known organosilicon materials and are described in U.S. Pat. Nos. 2,714,099; 2,894,930; 2,915,497 and 3,732,330, the disclosure of which is hereby incorporated by reference. Basically, these resins contain phenyl and vinyl groups and the curing is through the vinyl group either by way of a free radical reaction of the vinyl or by way of addition of an SiH to a vinyl. In lieu of the vinyl siloxanes, one can employ silacyclopentenyl siloxanes in which the substituent group on the silicon is the butenylene group. Such siloxanes are known materials and are described in U.S. Pat. No. 3,509,191.

It can be seen that the resins employed in this invention can be either one or two component. In the one component system, the base resin containing the vinyl or butenylene radical is cured by using a free radical generator which causes curing via the unsaturated group. Typical free radical generators are electromagnetic radiation such as electrons, or X-rays or chemical free radical generators such as peroxides or azobisnitriles. If desired, low molecular weight reactive diluents composed of phenyl, methyl, vinyl or silacyclopentenyl siloxanes can be employed to make the base resin less viscous.

Alternatively, the resins employed in this invention can be two component in which the base resin contains the vinyl and/or butenylene group and the crosslinker contains SiH groups. In this system the preferred catalysts are group VIII metals such as platinum or palladium. For the purpose of this invention, the metal can be in any desired form such as, for example, the finely divided metal per se or organic or inorganic compounds of the metals.

The phenyl to silicon ratio is calculated, based on the total phenyl content of the base resin and any crosslinker or diluent employed. The preferred phenyl to silicon ratio is from 0.2 to 1.2 and the most preferred ratio is from 0.2 to 0.7.

When the phenyl to silicon ratio is about 0.2 best results are obtained by increasing the amount of trifunctional silicon units (i.e. $RSiO_{1.5}$) and/or the number of unsaturated groups (i.e. Vi or butenylene). This insures that the crosslink density of the resin will be sufficiently high to give the desired hardness. In other words, other things being equal, the lower the phenyl content, the higher the crosslink density is needed to give the required hardness and toughness to give good machinability.

The term "essentially all the substituents" means that the siloxane compositions can contain small amounts of other organic substituents or OH on the silicon atoms which do not materially affect the functioning of the composition to cure to a clear hard material suitable for fabricating lenses.

Any combination of the siloxane units shown below can be employed for the purpose of this invention provided the phenyl to silicon ratio in the cured resin is at least about 0.2 and there is sufficient vinyl and/or butenylene groups in the siloxane to cause it to cure to the desired degree of hardness, i.e. a durometer of at least 60 on the D scale.

Specific examples of siloxane units which can be employed herein are monophenylsiloxane, phenylmethylsiloxane, diphenylsiloxane, diphenylmethylsiloxane, phenyldimethylsiloxane, phenylmethylvinylsiloxane, monomethylsiloxane, dimethylsiloxane, trimethylsiloxane, methylvinylsiloxane, dimethylvinylsiloxane, phenylvinylsiloxane, triphenylsiloxane, diphenylvinylsiloxane, $SiO_2$ units, silacyclopentenylsiloxane, silacyclopentenylmethylsiloxane, silacyclopentenylphenylsiloxane, $HSiO_{1.5}$, methylhydrogensiloxane, phenylhydrogensiloxane, dimethylhydrogensiloxane, diphenylhydrogensiloxane and phenylmethylhydrogensiloxane.

In lieu of the methyl radical in any of the above units, one can employ for example the alkyl radicals ethyl, propyl or isopropyl and the haloalkyl radicals chloromethyl, 3-chloropropyl or 3,3,3-trifluoropropyl. It should be understood that any of the above siloxane units can be in any of the components of the polysiloxane composition.

When a two or more component composition is used, it is, of course, important that all components be compatible. Otherwise, the resulting product will be cloudy and non-uniform and unfit for lens use.

In order to prepare lenses, the resin compositions are mixed with a catalyst, cast into a cylindrical form and then cured at temperatures ranging from 100° to 200° C. for times 5 to 500 hours. The precise time and temperature of cure is not critical so long as the desired hardness is obtained in the resin. The cured cylinders are then formed into buttons approximately 0.5 inches (12.7 mm) in diameter and 0.187 inches (4.7 mm) thick. These buttons are then fabricated into lenses by conventional techniques employed with hard lens materials. This includes the conventional lathing, grinding, polishing and edging techniques.

The term "at the temperature of fabrication" means the ambient temperature at which the material is fabricated into an optical device. Materials which have the requisite hardness at, say, 30° C. may be too soft at 60° C. or a material too soft at 30° C. may be hard enough at, say, 10° C. or 20° C.

In order for the lens to perform well in the eye, it must be made hydrophilic and this can be done with the materials of this invention by any of the standard techniques employed in the art and particularly by the Gesser process set forth in U.S. Pat. No. 3,925,178.

One of the advantages of the lenses of this invention is the high degree of oxygen permeability. Percent equivalent oxygen performance in the open eye is the best way of determining the actual performance of a material and this method is described by R. M. Hill et al., International Contact Lens Clinic, pages 27–29, Winter, 1975, which is incorporated herein by reference. Briefly, this method involves measuring the uptake of oxygen by the cornea from a limited reservoir after a contact lens has been worn and comparing this profile with the standard profile that has been generated by first bathing the cornea with a gas mixture containing a known partial pressure of oxygen. The percent EOP is the percent of oxygen in the latter gas mixture. In short, this is a measure of how much oxygen the cornea needs against how much the lens will give it.

The determination of percent equivalent oxygen performance by the Hill et al. method is slow so a faster method has been devised by applicants. It involves calculating the open eye percent equivalent oxygen performance by measuring the oxygen transmissability of the lens material using the oxygen flux meter S/V 920a manufactured by Schema Versatae Corporation to obtain the DK value of the lens material from which the flux can be calculated according to the equation $$F_1 = \frac{DK}{L} \times \Delta P$$

where $F_1$ is the flux through the lens in $$\frac{\mu l(O_2)}{cm^2/hr.},$$

DK is a product of the diffusion coefficient and the oxygen solubility in the material and is expressed in $$\frac{cm^3/cm}{cm^2/sec./cm\ Hg},$$

L is the thickness of the material in centimeters (cm) and $\Delta P$ is the pressure drop of oxygen across the material. The oxygen flux of the cornea is derived by the equation $F_c = \alpha P^\beta$ where $F_c$ is the oxygen flux into the cornea, P is the partial pressure of oxygen at the face of the cornea, $\alpha = 0.026789$ and $\beta = 1.0298$.

In order to calculate the EOP one equates $$\frac{DK}{L} \Delta P = \alpha P^\beta$$

and incrementally solves the equation for $P_{O_2}$ by plotting $F_1$ on the scale log of oxygen flux against the log of $\Delta P$ and by plotting $F_c$ on the scale log oxygen flux against log P. The two plots are then overlayed and $P_{O2}$ is indicated by the point of intersection of the two curves. This value is then inserted in the equation $$EOP = P_{O2} \times \frac{21}{155}$$

to calculate the percent EOP.

This method has shown excellent agreement as between calculated and observed EOP values. For example, for silicone rubber lens material, the calculated value of EOP is 19.4 percent and the value observed by the Hill et al. method is 19.2 percent. For cellulose acetate butyrate lens material, the calculated value is 3.0 percent and the observed value is 2.4 percent and for polymethylmethacrylate lenses the observed value is less than 1 percent and the calculated value is less than 1 percent. It is considered that an EOP of 10 percent or above gives best results with respect to wearer comfort. The higher the EOP, the better.

For the purpose of this invention, the DK of the resins used herein was measured polarographically using the above oxygen flux meter according to the instructions of the manufacturer. This involves positioning the lens in the apparatus and immersing it in a isotonic solution of sodium chloride, buffered at a pH of 7 to 9. Air is then bubbled through the solution on top of the lens so that the oxygen diffuses through the solution and the lens to the platinum electrode. Each run was made until equilibrium was established as shown by the instrument reading and the DK was calculated by the equation $DK = L \times 1.84 \times 10^{-8}$ (meter reading)/$P_{O2}$ where $P_{O2}$ is the partial pressure of oxygen in air and L is the thickness of the material.

The flexural strengths, tangent modulus and secant modulus of the cured resins were determined on a table model Instron having a 2 inch (5.08 cm) span flex test fixture using a chart speed of 2 inches (5.08 cm) per minute and a crossarm speed of 0.2 inches (0.49 cm) per minute. The hardness was determined at room temperature on a Shore D durometer on ½ inch (1.27 cm) diameter rods.

In the following examples the following abbreviations are used: Ph for phenyl, Vi for vinyl, Me for methyl, Bu for butyl, Pr for propyl and $F_3Pr$ for 3,3,3-trifluoropropyl. All percent EOP are for 0.1 mm thickness.

The following examples are illustrative only and should not be construed as limiting the invention which is properly delineated in the appended claims.

EXAMPLE 1

(I) A base resin was made having the composition 75.0 mole percent of monophenylsiloxane and 25 mole percent dimethylvinylsiloxane. To 74.5 parts by weight of the base resin was added 2.5 parts of the diluent $Ph_2Si(OSiMe_2Vi)_2$. (II) A Second base resin was made having the formulation of 37.5 mole percent monophenylsiloxane, 7.5 mole percent monomethylsiloxane, 20 mole percent methylvinylsiloxane, 30 mole percent dimethylsiloxane, and 5 mole percent trimethylsiloxane.

Each of the resins I and II were mixed with the crosslinker composed of 10 mole percent trimethylsiloxane 55 mole percent methylhydrogensiloxane, and 35 mole percent diphenylsiloxane in amount to give one SiH to one SiVi in the mixture. Ten parts per million platinum was added to each in the form of $[Bu_3PPtCl_2]_2$. Each resin mixture was cast into rods one half inch in diameter (12.7 mm) and cured according to the following schemes: Resin I was cured for 2 hours at 150° C. in the rod mold and then 16 hours at 150° C. out of the mold. Resin II was cured as resin I followed by one week at 100° C. The cured resins had the following properties: (I) phenyl to silicon ratio 0.744, EOP of 8.8 percent, durometer Shore D 73. (II) phenyl to silicon ratio 0.462, EOP of 11.7 percent and durometer Shore D 76.

Each cured resin was fabricated into contact lenses using the standard techniques employed with hard lenses such as those made from polymethylmethacrylate. Each lens was then rendered hydrophilic by the Gesser process, supra, and fitted into patients eyes. The visual acuity of the lenses was comparable to standard hard lenses and the lenses were worn with appropriate comfort by the patient.

The following base resins were formulated as shown below and were cured as I and II above and fabricated into satisfactory contact lenses as shown above.

TABLE I

| | Composition of resin in mole percent | | | | |
|---|---|---|---|---|---|
| $PhSiO_{3/2}$ | $Me_2SiO$ | MeViSO | $MeSiO_{1.5}$ | $Me_3SiO_{.5}$ | $Me_2ViSiO_{.5}$ |
| 45.0 | 30 | 20 | — | 5 | — |
| 37.5 | 30 | 20 | 7.5 | 2.5 | 2.5 |
| 37.5 | 35 | 15 | 7.5 | — | 5 |

EXAMPLE 2

This example shows the use of one-component resins. Base resin (II) of Example 1 was mixed with one percent by weight of dicumyl peroxide and cured at 200° C. for 64 hours. The cured resin was clear and had a phenyl to silicon ratio of 0.375, an EOP of 11.7 percent and a durometer Shore D of 72.

A second material having the formulation 37 mole percent methylvinylsiloxane, 58.4 mole percent phenylmethylsiloxane and 4.6 mole percent phenylmethylvinylsiloxane was cured with one percent by weight dicumyl peroxide in the same manner to give a clear resin. The properties of this resin were phenyl to silicon ratio of 1, an EOP of 5.1 percent, and a Shore D durometer of 72. The properties of each resin show it to be suitable for producing of an oxygen permeable contact lens.

EXAMPLE 3

In all the formulations shown below the base resin and crosslinker were mixed in amount to give an SiH to SiVi ratio of 1 to 1. To each mixture was added 10 ppm Pt in the form of $(Bu_3PPtCl_2)_2$. Resins A1 and A2 were cured at 150° C. for 16 hours while the remaining formulations were cured at 200° C. for 16 hours.

The compositions of the base resins in mole percent are given below.

TABLE II

| | $PhSiO_{1.5}$ | PhViSiO | $ViSiO_{1.5}$ | $MeSiO_{1.5}$ | MeViSiO | $Me_2SiO$ | $Me_2ViSiO_{.5}$ | $Me_3SiO_{.5}$ | Other |
|---|---|---|---|---|---|---|---|---|---|
| A | 75.0 | — | — | — | — | — | 25.0 | — | — |
| B | 72.8 | — | — | — | — | — | 26.3 | — | 0.9* |
| C | 35.0 | — | 20 | — | — | 40 | — | 5 | — |
| D | 37.5 | — | — | 7.5 | 20 | 30 | — | — | 5** |

TABLE II-continued

| | PhSiO$_{1.5}$ | PhViSiO | ViSiO$_{1.5}$ | MeSiO$_{1.5}$ | MeViSiO | Me$_2$SiO | Me$_2$ViSiO$_{.5}$ | Me$_3$SiO$_{.5}$ | Other |
|---|---|---|---|---|---|---|---|---|---|
| E | 37.5 | — | — | 7.5 | 20 | 30 | — | 5 | — |
| F | 37.5 | — | — | 7.5 | 15 | 35 | 5 | — | — |
| G | 25 | 50 | — | 25.0 | — | — | — | — | — |
| H | — | 20 | — | 30.0 | 20 | 30 | — | — | — |

*Ph$_2$SiO
** 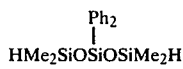

The crosslinkers employed were:

1. HMe$_2$SiOSiOSiMe$_2$H with Ph$_2$ on middle Si 
2. (HMe$_2$SiO)$_3$SiPh
3. (HMe$_2$SiO)$_4$Si
4. 10 mol % Me$_3$SiO$_{0.5}$, 55 mol % MeHSiO and 35 mol % Ph$_2$SiO Properties of the cured resins are shown below:

TABLE III

| Combination Used | Ph/Si Ratio | % EOP at 0.1 mm | Shore D Durometer |
|---|---|---|---|
| A-2 | 0.625 | 10.5 | 73 |
| A-1 | 0.726 | 8.1 | 71 |
| C-4 | 0.443 | 11.4 | 78 |
| D-4 | 0.462 | 11.4 | 77 |
| E-3 | 0.300 | 13.2 | 66 |
| F-4 | 0.462 | 11.4 | 76 |
| G-1 | 0.711 | 7.6 | 77 |
| H-4 | 0.410 | 9.9 | 80 |
| C-3 | 0.250 | 13.9 | 75 |

The flexural properties of these samples ranged as follows:

| | PSI | Pa |
|---|---|---|
| Flexural strength | 4000 to 7000 | 27,600 to 48,300 |
| Tangent modulus | 87,000 to 183,000 | 600,000 to 1,267,000 |
| Secant modulus | 15,600 to 111,000 | 107,600 to 765,900 |

These properties show each of these materials has the required physical strengths and hardness to be machined by standard techniques used to fabricate a hard contact lens. All of the resins were clear when cured.

EXAMPLE 4

This example shows the operativeness of resins containing alkyl and haloalkyl radicals. Resins were prepared having the formulations shown below and each was mixed with crosslinker 4 of Example 3 in the amount of one SiH to one SiVi. Each was mixed with 10 ppm Pt in the form of (Bu$_3$PPtCl$_2$)$_2$ and cured by heating 2 hours at 150° C. and then 16 hours at 200° C. The properties of the cured, clear resins are given below.

TABLE IV

| Composition in mol % | | | | |
|---|---|---|---|---|
| PhSiO$_{1.5}$ | F$_3$PrSiO$_{1.5}$ | MeViSiO | Me$_2$SiO | Me$_3$SiO$_{.5}$ |
| A. 37.5 | 7.5 | 20 | 30 | 5 |
| B. 37.5 | 7.5 | 20 | 30 | 5 |

TABLE V

| | | Properties of cured resin | | | |
|---|---|---|---|---|---|
| | Ph/Si ratio | % EOP at 0.1 mm | Shore D Durometer | Flexural Strength psi | Tangent Modulus psi | Secant Modulus psi |
| A. | 0.462 | 12.1 | 75.4 | 5,900 | 132,000 | 52,000 |
| B. | 0.462 | 13.2 | 74.5 | 5,190 | 131,000 | 52,000 |

That which is claimed is:

1. As an optical device a lens to be worn against or inside the eye having an open eye EOP of at least 3 percent at 0.1 mm thickness and a light transmission of at least 85% consisting essentially of a cured phenylpolysiloxane resin having a durometer of at least 60 on the D scale at the temperature of fabrication, said resin having been prepared by curing a polysiloxane composition having a phenyl to silicon ratio of at least about 0.2 and sufficient vinylsiloxane or silacyclopentenylsiloxane to give the desired durometer to the cured resin, essentially all the substituents on the silicon atoms in said siloxane composition in addition to phenyl being selected from the group consisting of vinyl and butenylene and optionally alkyl or haloalkyl radicals of 1 to 3 carbon atoms and hydrogen.

2. A lens in accordance with claim 1 in which the substituents on the silicon atoms of the siloxane composition are phenyl, vinyl and methyl.

3. A lens in accordance with claim 1 in which the substituents on the silicon atoms in the siloxane composition are phenyl, methyl, vinyl and hydrogen.

4. A lens in accordance with claim 1 in which the phenyl to silicon ratio is from 0.2 to 0.7.

5. A lens in accordance with claim 2 in which the phenyl to silicon ratio is from 0.2 to 0.7.

6. A lens in accordance with claim 3 in which the phenyl to silicon ratio is from 0.2 to 0.7.

7. A device in accordance with claim 1 in which the lens is a corneal lens.

8. A device in accordance with claim 2 in which the lens is a corneal lens.

9. A device in accordance with claim 3 in which the lens is a corneal lens.

10. A device in accordance with claim 4 in which the lens is a corneal lens.

11. A device in accordance with claim 5 in which the lens is a corneal lens.

12. A device in accordance with claim 6 in which the lens is a corneal lens.

* * * * *

UNITED STATES PATENT AND TRADEMARK OFFICE
CERTIFICATE OF CORRECTION

PATENT NO. : 4,198,131

DATED : April 15, 1980

INVENTOR(S) : Arthur A. Birdsall; John K. Fitzgerald;
David P. Jones; Keith E. Polmanteer It is certified that error appears in the above-identified patent and that said Letters Patent are hereby corrected as shown below.

In Column 7, line 20; the line reading "$HMe_2SiOSiOSiMe_2H$" with $Ph_2$ on the Si should read "1. $HMe_2SiOSiOSiMe_2H$" with $Ph_2$ on the Si Signed and Sealed this Seventeenth Day of November 1981

[SEAL]

Attest:

GERALD J. MOSSINGHOFF

Attesting Officer     Commissioner of Patents and Trademarks